United States Patent [19]

Prevorsek et al.

[11] 4,055,606
[45] Oct. 25, 1977

[54] NOVEL COPOLYESTER-POLYEPOXIDE COMPOSITIONS

[75] Inventors: Dusan C. Prevorsek, Morristown; Shaul M. Aharoni, Morris Plains, both of N.J.

[73] Assignee: Allied Chemical Corporation, Morris Township, N.J.

[21] Appl. No.: 698,247

[22] Filed: June 21, 1976

[51] Int. Cl.² .............................................. C08L 63/00
[52] U.S. Cl. ............................. 260/835; 260/830 TW; 428/416
[58] Field of Search ........................................ 260/835

[56] References Cited
U.S. PATENT DOCUMENTS

| | | | |
|---|---|---|---|
| 2,683,131 | 7/1954 | Cass | 260/835 |
| 2,691,007 | 10/1954 | Cass | 260/835 |
| 2,830,031 | 4/1958 | Fisch | 260/835 |
| 3,384,679 | 5/1968 | Stetz | 260/835 |
| 3,723,568 | 5/1973 | Hoeschele | 260/835 |
| 3,723,569 | 5/1973 | Hoeschele | 260/835 |

*Primary Examiner*—Paul Lieberman
*Attorney, Agent, or Firm*—Robert J. North; Ernest A. Polin

[57] ABSTRACT

Novel copolyester-polyepoxide compositions possessing a high green strength and tack before curing and characterized by having a single discernible glass transition temperature are produced. The compositions are composed of a copolyester and a polyepoxide mixture containing high, intermediate and low molecular weight components. They are especially useful as gap-filling adhesives and for various other adhesive applications. Methods of preparation are also described.

19 Claims, No Drawings

NOVEL COPOLYESTER-POLYEPOXIDE COMPOSITIONS

BACKGROUND

Adhesives have found use in a wide variety of industrial applications especially in bonding substrates together. New areas of possible application exist for coupling together, e.g. joining, two or more parts whose dimensions may not always exhibit a perfect fit. Such mismatched structures are frequently encountered in metal stamping operations because of differences in the spring back characteristics of the particular sheet metal used. Another example of such an imperfect fit is encountered in a tubular joint connection consisting of a female member and a male member, which is a common part of the piping system of many household appliances. Currently, this type of joint is assembled by inserting the male member into the female member and fastening the assembly together with a metal fastener or clip. A problem arises where in a typical production operation there are variations statistically produced in the diameters of both the female and male numbers and therefore the fastening together of the assembly by means of a mechanical fastener does not produce an exact fit. This results in a potential leak in the system due to the formed gap between the surfaces and is obviously detrimental to the working efficiency of the entire system, particularly when the tube is part of a piping system conducting hot or cold water or a refrigerant.

Thus, a need exists for an adhesive which possesses good adhesion to untreated and treated metal, as well as good gapfilling properties between the surfaces of the mismatched parts, to insure satisfactory mechanical performance of the assembly. Also, the adhesive should possess the proper tack to station the two elements together upon assembly and a high green strength to maintain that position and spatial integrity of the two elements as the assembly is prepared for the subsequent curing step. Also, the adhesive should have a relatively long pot life before curing and reasonably fluid viscosity to enable it to be applied in the molten state by a suitable applicator.

Hot melt adhesives have been found to be unsatisfactory mainly because of a large contraction upon cooling. As a result, high stresses develop in the adhesive layer which on cooling leads to failure of the joint. Thermosetting materials have been found to possess lower than adequate green strength to hold the male member firmly in the female member before curing, resulting in a dislodging of the male member by applied stress before curing. Blends of thermoplastic and thermosetting materials have been used employing mainly copolyesters as the thermoplastic component and an epoxy resin as the thermosetting component. The blends containing a relatively low molecular weight epoxy resin give good tack and adhesion properties, but poor green strength. On the other hand, blends containing a high molecular weight epoxy resin given good green strength but poor tack and initial adhesion upon joining the elements together. Blend of such thermoplastic and thermosetting materials that are used are typical of those which are known in the prior art and are described in U.S. Pat. No. 3,723,528 and 3,723,529 (Hoeschele), U.S. Pat. No. 3,749,758 (Gannon) and U.S. Pat. No. 3,329,740 (Battersby).

SUMMARY

In accordance with the present invention, there are provided novel copolyester-polyepoxide compositions which exhibit superior properties as gap-filling adhesives. They exhibit a high green strength, excellent tack and adhesion properties, and a high bond strength after curing. Their relatively low viscosity and long pot life lend themselves to a variety of application techniques. The compositions of this invention comprise:

A. a copolyester having a number average molecular weight in the range from about 6,000 to about 50,000;

B. a polyepoxide mixture comprising a high, intermediate and low molecular weight components wherein a. about 25 to 75 weight percent of said mixture is said high molecular weight component having a weight average molecular weight in the range of above 25,000 to about 120,000 and an epoxide equivalent in the range from above 10,000 to about 60,000;

b. about 15 to 65 weight percent of said mixture is said intermediate molecular weight component having a weight average molecular weight in the range of above 3,000 to 25,000 and an epoxide equivalent in the range from above 1,600 to 10,000;

c. about 5 to 35 weight percent of said mixture is said low molecular weight component having a weight average molecular weight in the range of about 150 to 3,000 and an epoxide equivalent in the range from about 50 to 1,600, said polyepoxide mixture being present in an amount of at least 50% but not more than about 200% by weight based on said copolyester; and C. an epoxy curing agent present in the amount from 0 to about 1.1 equivalents per epoxy equivalent.

The compositions are characterized by possessing before curing a single discernible glass transition temperature as measured by differential scanning calorimetry which is evidence of a high degree of homogeneity. As a result, they exhibit excellent gapfilling characteristics and desirable adhesion and tack properties especially in mismatched parts and tubular joint applications.

A method of preparing the copolyester-polyepoxide compositions suitable for these applications comprises dissolving the copolyester in a solvent therefor, dissolving the polyepoxide mixture in a solvent therefor which is miscible with that used for the copolyester, mixing the two solutions together with agitation to produce a homogeneous solution, and recovering the copolyester-polyepoxide composition from the solution by rapid removal of the solvent from the composition at such a rate that it exceeds the rate of phase separation between the copolyester and polyepoxide mixture. This method may be broadly employed in the preparation of any copolyester-polyepoxide composition possessing a single discernible glass transition temperature as measured by differential scanning calorimetry.

DETAILED DESCRIPTION

The copolyesters of the present invention can be prepared by any of the conventional procedures well known in the art for reacting dicarboxylic acids or their equivalents with dihydroxy compounds. The copolyesters suitable for use in this invention have an intrinsic viscosity of at least 0.4 gram per deciliter, as measured in 60/40 weight percent tetrachloroethane/phenol at 25° C., and a number average molecular weight $\overline{M}_n$ in the range from about 6,000 to about 50,000, preferably from about 12,000 to 40,000 and more preferably from about 15,000 to 25,000.

The term number average molecular weight $\overline{M}_n$ as used herein is defined as follows:

$$\overline{M}_n = \frac{\sum_{i=1}^{\infty} M_i N_i}{\sum_{i=1}^{\infty} N_i}$$

where the summation $$\sum_{i=1}^{\infty} N_i$$

represents the total number of molecules in a sample, $N_i$ represents the number of molecules of molecular weight $M_i$ and the summation $$\sum_{i=1}^{\infty} M_i N_i$$

represents the total weight of the sample.

Essentially linear copolyesters are preferred, but, a small amount of branching is allowable through the use of a triol or polyol component in the preparation of the copolyester as long as gelation is precluded upon copolyester formation. These limitations insure that the copolyester component will contribute the necessary properties of yield, flow and final glass transition temperature to the copolyester-polyepoxide compositions. The term glass transition temperature, $T_g$, as herein used, refers to that temperature at which an amorphous material changes from a brittle, vitreous state to a plastic state, and more specifically, to that temperature at which a change occurs in the slope of the curve of volume vs. temperature of an amorphous material.

The dicarboxylic acids used in preparing the copolyesters can either be aromatic, aliphatic or cycloaliphatic in nature. Usually they have a molecular weight below 300, and contain preferably from 8–16 carbon atoms. Equivalents of the dicarboxylic acids can also be used, namely esters and ester-forming compounds such as acid halides and anhydrides. The dicarboxylic acids can contain any substituents which do not interfere with the copolyester formation. Representative aliphatic and cycloaliphatic dicarboxylic acids which can be used are sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethylmalonic acid, allylmalonic acid, 4-cyclohexene-1,2-dicarboxylic acid, 2-ethylsuberic acid, 2,2,3,3-tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4'-methylenebis(cyclohexane carboxylic acid), 3,4-furan dicarboxylic acid and 1,1-cyclobutane dicarboxylic acid. The preferred aliphatic dicarboxylic acid is sebacic acid and esters thereof.

Representative aromatic dicarboxylic acids which can be used include phthalic, terephthalic and isophthalic acids, bi-benzoic acid, substituted dicarboxy compounds with two benzene nuclei such as bis(p-carboxyphenyl)methane, p-oxy(p-carboxyphenyl)benzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid.

Aromatic dicarboxylic acids are an especially preferred class for preparing the copolyesters of this invention. Among the aromatic dicarboxylic acids, those with 8 to 16 carbon atoms are especially preferred, particularly the phenylene dicarboxylic acids, e.g., phthalic, terephthalic and isophthalic acids, their dimethyl ester derivatives and mixtures thereof.

The dihydroxy compounds used in preparing the copolyesters can be either high molecular weight glycols or low molecular weight diols. The high molecular weight glycols refer to polymeric glycol components possessing molecular weights from about 200 to 6,000. These are essentially poly(alkylene oxide) glycols having a carbon to oxygen ratio of about 2.0–4.3. Representative long-chained glycols are poly(ethylene oxide) glycol, poly(1,2-and 1,3-propylene oxide) glycol, poly(tetramethylene oxide) glycol and random copolymers of ethylene oxide and 1,2 propylene oxide. Included among the low molecular weight diols which react to form short-chained ester units are acyclic, alicyclic and aromatic dihydroxy compounds. Preferred are diols with 2–15 carbon atoms such as ethylene, propylene, tetramethylene, pentamethylene, 2,2-dimethyltrimethylene, hexamethylene and decamethylene glycols, dihydroxycyclohexane, cyclohexane dimethanol, resorcinol, di(betahydroxyethyl)resorcinol, hydroquinone, 1,5-dihydroxy naphthalene, etc. Especially preferred are aliphatic diols containing 2 to 8 carbon atoms. Included among the bis-phenols which can be used are bis(p-hydroxy)diphenyl, bis(p-hydroxyphenyl)methane and bis(p-hydroxyphenyl)propane. Equivalent ester-forming derivatives of diols are also useful (e.g. ethylene oxide or ethylene carbonate can be used in place of ethylene glycol).

Examples of some copolyesters which can be utilized in the present invention are the halogenated copolyesters, where the aromatic rings in the diacid moiety are halogen-containing, the polyester-sulfone copolyesters containing an aromatic sulfone component and the polyester carbonates, preferably the class prepared by the reaction of polyhydric phenols with phosgene.

Preferred copolyesters are those containing the moieties prepared by the condensation of one or more of the following diesters or their equivalents: dimethyl terephthalate, dimethyl isophthalate, and dimethyl sebacate with one or more of the following glycols: ethylene glycol, poly(tetramethylene oxide) glycol having a molecular weight of about 200 to 2,000 and resorcinol di(beta-hydroxyethyl)ether. Other methods well known in the art can be utilized to produce these copolyesters.

Most preferred are those copolyesters having the same composition as prepared by the condensation of dimethyl terephthalate, dimethyl isophthalate and dimethyl sebacate with a mixture of ethylene glycol, polyy(tetramethylene oxide)glycol having a molecular weight of about 200 to 2,000 and resorcinol di(beta-hydroxyethyl)ether. By choosing the proper proportions of diesters and diols, or their equivalents, various desired glass transition temperatures ($T_g$) can be obtained for the copolyester-polyepoxide composition depending upon the particular end use.

Preparation of four typical copolyesters used in the invention are illustrated below, but the copolyesters themselves or the particular methods of preparation are not to be construed as limitations of the invention.

Copolyester A is prepared by placing 0.4 mol dimethyl isophthalate, 0.03 mol dimethyl sebacate, 1.2 mols of ethylene glycol, 0.05 mol poly(tetramethylene oxide) glycol of molecular weight above 1,000 and a catalytic amount of zinc acetate into a reaction vessel. The temperature is brought to 195 ± 15° C. under a nitrogen atmosphere with constant stirring. At this temperature, methanol starts distilling out in the nitrogen stream. After cessation of methanol formation (about 90 minutes), a catalytic amount of antimony triacetate is added, the temperature brought up to about 290° ± 15° C. and vacuum applied. At this point, ethylene glycol starts distilling over, and the temperature and vacuum conditions are maintained for about 2 hours. The stirring is then stopped, vacuum broken, heat removed and the resulting copolyester product transferred into a dry ice container to cool. The copolyester having a glass transition temperature of −3° C, is then dried and pelletized for further use.

Copolyester B is prepared from 0.37 mol dimethyl terephthalate, 0.16 mol dimethyl isophthalate, 0.03 mol dimethyl sebacate, 1.13 mols ethylene glycol, 0.03 mol polytetramethylene ether glycol of molecular weight about 1,000, and 0.103 mol resorcinol di(beta-hydroxyethyl)ether by a similar procedure as described above for Copolyester A. The glass transition temperature of this copolyester is −15° C.

Copolyester C is prepared from 0.6 mol dimethyl terephthalate, 0.4 mol dimethyl isophthalate and 2.39 mol ethylene glycol by a similar procedure as described for Copolyester A. Its glass transition temperature is 65° C.

Copolyester D is prepared from 0.34 mol dimethyl terephthalate, 0.16 mol dimethyl isophthalate, 0.25 mol dimethyl sebacate and 1.7 mols ethylene glycol by a similar procedure as described above for Copolyester A. The glass transition temperature of this copolyester is 9° C.

As set forth above, the copolyester is used in combination with a broad molecular weight polyepoxide which is composed of high, intermediate and low molecular weight components. The weight average molecular weight $\overline{M}_w$ is in the range for the high molecular weight component from above 25,000 to 120,000, preferably from about 50,000 to 100,000, and more preferably from about 70,000 to 90,000. The weight average molecular weight range for the intermediate molecular weight component is above 3,000 to 25,000, preferably from about 5,000 to 20,000, and more preferably from about 8,000 to 10,000. The weight average molecular weight range for the low molecular weight component is from about 150 to 3,000, preferably from about 150 to 1,000, and more preferably from about 150 to 600. The term weight average molecular weight $\overline{M}_w$ as used herein is defined by the formula:

$$\overline{M}_w = \frac{\sum_{i=1}^{\infty} N_i M_i^2}{\sum_{i=1}^{\infty} N_i M_i}$$

where $N_i$ represents the number of molecules of molecular weight $M_i$ in a sample and the summation $$\sum_{i=1}^{\infty} N_i M_i$$

represents the total weight of the sample.

The weight percent of the polyepoxide mixture consisting of the high molecular weight component is from about 25 to 75 percent, preferably from about 35 to 65 percent, and more preferably from about 45 to 55 percent. The weight percent of the polyepoxide mixture consisting of the intermediate molecular weight component is from about 15 to 65 percent, preferably from about 25 to 55 percent, more preferably from about 35 to 45 percent. The weight percent of the polyepoxide mixture consisting of the low molecular weight component is from about 5 to 35 percent, preferably from about 5 to 25 percent, and more preferably from about 5 to 15 percent.

The total weight used of said polyepoxide mixture based on the copolyester is in the range of at least about 50 percent to no more than 200 percent by weight. Preferably the weight of said polyepoxide used is from about 50 to 120 percent by weight of copolyester used and more preferably, from about 80 to 120 percent.

The epoxide equivalent is a measure of the weight percent of 1,2-epoxy groups per total weight of the molecule. More specifically, it is the total average molecular weight of the resin divided by the number of epoxide groups present. Usually the units of grams/unit epoxide are omitted by those skilled in the art when describing epoxy resins, but the units are understood and are used in this manner in the description of this invention.

The epoxide equivalent for the high molecular weight component is in the range from above 10,000 to about 60,000, preferably from 10,000 to 45,000, and more preferably from 11,000 to 35,000. The epoxide equivalent for the intermediate molecular weight component is in the range from above 1,600 to 10,000, preferably from 2,000 to 8,000, more preferably from 2,500 to 7,500. The epoxide equivalent for the low molecular weight component is in the range from about 50 to 1,600, preferably from 75 to 1,000, more preferably from 360 to 500.

The high molecular weight and intermediate molecular weight components preferably are formed by the polymerization of the reaction products of epihalohydrins with polyhydric phenols. The term polyhydric phenols, as used herein, refers to aromatic compounds containing at least two phenolic groups, both of which are capable of reacting with epihalohydrins, and the term epihalohydrins refers to the 1,2-epoxy-3-halopropanes. The reaction product of epihalohydrins with a difunctional polyhydric phenol is termed a diglycidyl ether, which in turn is polymerized to yield a polyglycidyl ether. Representative polyepoxides of this type include those prepared by polymerization of the reaction products of epihalohydrins with polyhydric phenols such as 4,4'-isopropylidene diphenol commonly known as bisphenol A, tetrabromobisphenol A, resorcinol, hydroquinone, pyrogallol, 4,4'-methylenebis(phenol) and polyhydric phenols derived from phenol or cresol and an aldehyde (novolacs).

Certain polyepoxides having at least two functionalities are particularly preferred as the high, intermediate and low molecular weight components in the instant invention. They include polyglycidyl ethers of bisphenol A having the following structure:

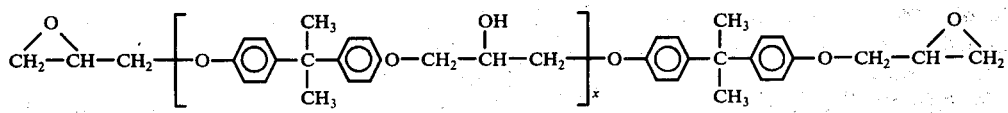

where X = 75 to 420 for the high molecular weight range and X = 10 to 75 for the intermediate molecular weight range, and where X = 0 to 10 for the low molecular weight range.

While the polyglycidyl ethers of polyhydric phenols are preferred for use as the high, intermediate and low molecular weight components, other types of polyepoxides can be satisfactorily utilized for the low molecular weight component which have the general formula:

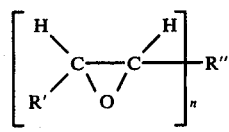

where $n$ is equal to 2 to 100, R' and R" are independently hydrogen or lower alkyl, e.g. $C_1$–$C_4$, and R'" is a polyvalent radical containing only the elements of C, H and O, with the exception that carbocyclic aromatic nuclei contained in R'" may be substituted with Cl or Br, R' and R" may be also joined to form a 5 or 6 membered carboxylic ring, and the epoxide has an epoxide equivalent of about 75 to 5,000. Representative polyepoxides of this formula include vinyl cyclohexene dioxide, bis(2,3-epoxycyclopentyl) ether, bis(3,4-epoxy-6-methylcyclohexylmethyl) adipate, 3-(3,4-epoxycyclohexane)-8,9-epoxy-dioxaspiro [5.5]-undecane, epoxidized butadiene and epoxidized natural oils.

Epoxides prepared from epihalohydrins such as epichlorohydrin and active hydrogen compounds such as polyglycidyl compounds are preferred for use as the low molecular weight component in the present compositions. These polyepoxides may be represented by the general formula:

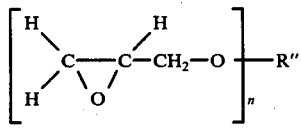

where $n$ is 2–10 and R" is a polyvalent radical containing only the elements of C, H and O with the exception that carboxylic aromatic nuclei contained in R" may be substituted with Cl or Br. R" may also be joined to form a 5 or 6 membered carbocyclic ring.

A polyepoxide mixture which represents a preferred embodiment of this invention and which is used in the examples set forth below is termed "Epoxy A" and consists of 50 weight percent of Union Carbide Phenoxy PKHH Grade, a high molecular polyepoxide having a weight average molecular weight of about 75,000, and 40 weight percent of Ciba Geigy Araldite 6099, an intermediate molecular weight polyepoxide having a weight average molecular weight of 8,000 to 10,000 and 10 weight percent of Ciba Geigy Araldite 6010, a low molecular weight polyepoxide having a weight average molecular weight of about 390. All three of these polyepoxides comprise different weight average molecular weight fractions of the polymerization products of bis-glycidyl ether of bisphenol A.

The preferred compositions of the instant invention are the compositions containing either Copolyester A or B and Epoxy in a 60/40 to 40/60 weight ratio. The most preferred embodiment is a composition containing Copolyester B and Epoxy A in about a 1 to 1 weight ratio.

Epoxy curing agents may be used in the amount from 0 to about 1.1 equivalents per epoxy equivalent, but it is preferred not to utilize the curing agent in an amount greater than 0.2 equivalent per epoxy equivalent in order to obtain more consistent results with respect to tack and green strength.

The epoxy curing agents which may be utilized are aromatic and aliphatic polyamines and cyclic anhydrides of polycarboxylic acids. The polyamines must contain at least two amine groups which can be primary and/or secondary amine groups. Representative polyamines which may be utilized include ethylene diamine, tetramethylene diamine, and 2,4-bis(4-amino-benzyl)aniline, of which the latter is preferred.

The method of preparation of copolyester-polyepoxide compositions having a single glass transition temperature as measured by differential scanning calorimetry is also a feature of the present invention and comprises dissolving a copolyester in a solvent, dissolving a polyepoxide in the same solvent or in a solvent which is miscible with the solvent used for the copolyester, mixing together the solutions of polyepoxide and copolyester with adequate agitation to produce a homogeneous mixture, and recovering the composition from the solution by removing the solvent from the composition at such a rate that it exceeds the rate of phase separation between the copolyester and polyepoxide.

Solvents that can be employed in this process are halogenated aliphatic hydrocarbons such as chloroform, dichloroethane, dichloromethane, perchloroethylene, tetrachloroethane, nitroaromatic compounds such as nitrobenzene, cyclic ethers such as tetrahydrofuran and dioxane, certain arylalkyl alcohols such as benzyl alcohol, phenols, cresols and halogenated phenols and cresols.

The copolyester and polyepoxide mixtures are separately dissolved in solvents forming solutions that comprise about 5 to 30 weight percent of polymer to solvent, preferably about 10 to 20 percent by weight and more preferably about 10 to 15 percent by weight. It is preferred to employ the same solvent for both solutions of copolyester and polyepoxide mixtures.

The mixing step is conveniently conducted by slowly adding one solution to another with sufficient agitation to produce a homogeneous solution. It is important to remove the solvent from the solution to recover the desired copolyester-polyepoxide composition in such a manner that phase separation between the copolyester and polyepoxide mixture does not occur. Such removal may be effected by the following methods:

METHOD I

This method involves the rapid evaporation of the solvent from the reaction mixture. According to this method, the solution is heated in a flat tray to a temperature at the boiling point of the solvent involved under a rapid stream of air. When most of the solvent is removed, and the resultant polymer is in the form of a solvent-logged film, vacuum is applied and the remainder of the solvent is stripped off. In this method, removal of the solvent can be completed within 3 hours, while evaporation without heat and/or vacuum takes considerably longer.

METHOD II

Another method involves the rapid dilution of the polymer solution with a solvent miscible with the solvents in the polymer solution but which is a nonsolvent for the desired copolyesterpolyepoxide composition. The rapid addition of the nonsolvent under agitation precipitates the composition out of solution in such a manner that phase separation does not occur. It is preferred to add the polymer solution in a thin stream to a rapidly stirred quantity of the nonsolvent. The ratio of nonsolvent to solvent is in the order of about 10:1. Solvent/nonsolvent pairs which are preferred are tetrachloroethane/petroleum ether or dioxane/water. For example, the copolyester and polyepoxide mixture are dissolved separately in tetrachloroethane, mixed together to form a homogeneous solution and then drowned into the nonsolvent petroleum ether to precipitate the polymer. Alternatively, the polymers can be dissolved in dioxane and drowned into water.

Method II is the preferred method of recovering the composition due to the more favorable economic aspects of using a cosolvent for the recovery of the composition, thus eliminating the need for a costly vacuum distillation.

Materials prepared by either method have essentially equivalent properties in that they possess single discernible glass transition temperatures at about the same temperature and exhibit essentially the same bond strength when subjected to the lap joint shear strength test. The glass transition temperature is the temperature at which maximum effective adhesion occurs and this factor is important in applications involving transfer of fluids at elevated, ambient and low temperatures. One skilled in the art can adjust the glass transition temperature of the composition, to match the temperature at which the particular desired end use occurs, by suitable choice of the copolyester and by varying the weight ratio of copolyester used to the polyepoxide mixture. The glass transition temperatures herein stated are measured on a differential scanning calorimeter (Du Pont Model 990 DSC) within a percent error of ± 1%.

The following examples, wherein parts are by weight except where otherwise stated, will serve to illustrate the scope and spirit of the invention but are not necessarily limitations thereof.

EXAMPLE I

Twelve parts of Copolyester A were dissolved in 120 parts of tetrachloroethane at 100° C. Eight parts of Epoxy A were dissolved in 80 parts of tetrachloroethane at 100° C. The resulting two solutions were mixed together with adequate agitation to produce a homogeneous solution at 100° C. The desire copolyester-polyepoxide composition was then recovered by the procedure of Method I by pouring the solution into a flat tray and heating at 140° C. under a stream of air until most of the solvent was removed. Vacuum was then applied and the remainder of the solvent was evaporated at a temperature of 140° C. The resulting solid, having a 6 to 4 weight ratio of copolyester to polyepoxide, when heat treated at 100° C. for 90 seconds produced a clear film having a single discernible $T_g$ of 27° C. A blend of the same materials in the same weight ratios produced by melt blending gave several $T_g$'s, −7° C., −3° C., +42° C.

EXAMPLE II

Ten parts of Copolyester were dissolved in 100 parts of chloroform at temperature of 55° C. Ten parts of Epoxy A were dissolved in 100 parts of chloroform at 55° C. The resulting two solutions were mixed together with adequate agitation to produce a homogeneous solution at 55° C. The desired copolyester-polyepoxide composition was then recovered by the procedure of Method II by pouring the polymer solution in a thin stream into 2,000 parts of petroleum ether at 25° C. with rapid agitation over a 3 minute period. The resulting solid having a 1 to 1 weight ratio of copolyester to epoxide possessed a single discernible $T_6$ of −7° C., whereas a blend of the same materials in the same weight ratios made by melt blending produced two $T_g$'s, 49° C. and 68° C.

EXAMPLE III

Ten parts of Copolyester B were dissolved in 100 parts of tetrachloroethane at 140° C. Ten parts of Epoxy A were dissolved in 100 parts of tetrachloroethane at 140° C. The resulting two solutions were mixed together with adequate agitation to produce a homogeneous solution at 100° C. The desired copolyester-polyepoxide composition was then recovered by the procedure of Method I whereby the solution was poured into a flat tray and heated at 140° C. under a stream of air until most of the solvent was removed. Vacuum was then applied and the remainder of the solvent was evaporated off at a temperature of 140° C. The resulting solid having a 1 to 1 weight ratio of copolyester to polyepoxide possessed a $T_g$ of 27° C., whereas a blend of the same materials in the same ratios produced by melt blending exhibited $T_g$'s at 12° C. and 43° C.

EXAMPLE IV

Ten parts of Copolyester C were dissolved in 100 parts of chloroform at 55° C. Ten parts of Epoxy A were dissolved in 100 parts of chloroform at 55° C. The resulting two solutions were mixed together with adequate agitation to produce a homogeneous solution at 55° C. The desired copolyester-polyepoxide composition was then recovered by the procedure of Method I whereby the solution was poured into a flat tray and heated at 55° C. under a stream of air until most of the solvent was removed. Vacuum was then applied and the remainder of the solvent was evaporated off at a temperature of 55° C. The resulting solid was composed of a 1 to 1 weight ratio of copolyester to polyepoxide having a single discernible $T_g$ of 60° C., whereas a conventional blend of the same materials in the same ratios produced by melt blending exhibited $T_g$'s of 52° C. and 30° C.

To illustrate the advantages of the compositions which are the subject of this invention, several tests were employed to test the effectiveness of these compositions in simulated industrial applications.

The first test conducted was a lap shear joint test according to ASTM standard D 1002-64 in which the lap joints were prepared from 0.071 inch thick aluminum alloy, but with a 1 inch overlap instead of the specified ½ inch overlap, thus yielding a 1.0 square inch area of overlap for each sample. Thus, the adhesive is applied to the overlap surface, the second metal strip placed over the adhesive to form the lap joint, the adhesive heated to the optimal application temperature for the duration yielding the best performance for the particular adhesive and then allowed to cool to room temperature. The strength of the resulting bond is then tested by applied stress as measured by an Instron Tester.

A second test called the "tubular joint test" was designed to simulate a typical tubular joint as encountered in industrial uses. The apparatus for the test consists of a smaller solid cylinder and a larger cylinder containing a cylindrical cavity into which the smaller solid cylinder can be fitted. However, the fit is not perfect and a 3 to 10 mils thick gap exists between the surfaces of the smaller (inner) and larger (outer) cylinders. The adhesive in the form of a film or a powder is placed into the gap between the inner and outer cylinders and cured by heating at a temperature and duration which is characteristic for each adhesive. Curing temperatures are used in the range of 160° C to 220° C with the optimal temperature typical of each system. After the heat cycle is completed, the samples are brought to the desired testing temperature and tested in shear by pulling in an Instron Tester.

A third test that was utilized is the so-called "box test". This test was designed to simulate hollow structures such as doors, walls, frames, etc., assembled together from two parts and bonded at the edges. Such structures combine light weight with rigidity and resistance to warpage and a hollow structure that can accommodate, for instance, insulating material.

The box is made of two separate parts. The smaller part is slightly smaller than 6 ×6 inches with ¾ inch high lips on each side. This part fits snugly in a larger part containing sides which are slightly larger than 6 × 6 inches containing ¾ inch lips on each side. This results in an imperfect fit and creates a gap that exists between the sides of the boxes. The adhesive is inserted into the gap as a film or a powder and the assembly is cured for a prescribed time. The box is then buried in dry ice for not less than 30 minutes, pulled out and immediately impacted forcefully on a solid surface. In the case of good adhesives, the metal part of the box will crack before the adhesive. In poor adhesives, the adhesive will fail before the metal and will crack or delaminate just from the exposure to the cold dry ice temperature, with no impact. Especially poor adhesives will fail simply due to the stresses produced in the adhesive layer upon contraction during the cooling phase from their application temperature to room temperature.

The advantages of the compositions of this invention can be aptly illustrated by examination of the following lap shear test results which were run on the compositions and simple melt blends of Examples I to IV for comparison:

| Sample | Lap Shear Strength |
|---|---|
| Example I composition | 2700 psi |
| Example I melt blend | 2050 psi |
| Example II composition | 1450 psi |
| Example II melt blend | 930 psi |
| Example III composition | 3580 psi |
| Example III melt blend | 2665 psi |
| Example IV composition | 2310 psi |
| Example IV melt blend | 1930 psi |

The data illustrate the fact that the compositions exhibit a higher lap shear strength than the corresponding melt blends illustrating the inherently better adhesion properties of the compositions due to their greatly increased homogeneity versus the simple melt blends.

The following lap shear strength data, using the lap shear test as described above, indicate the fact that all three molecular weight polyepoxide components are essential to produce the overall requirements of green strength, tack, final bond strength and gap-filling ability. The following polyepoxide components used in the subsequent tests are those comprising the Epoxy A mixtures as discussed earlier; Union Carbide Phenoxy PKHH Grade as the high molecular weight component, Ciba Geigy Araldite 6099 as the intermediate molecular weight component, and Ciba Geigy Araldite 6010 as the low molecular weight component.

| Copolyester | Weight Percent of Composition | Polyepoxide Components of Epoxy A in Weight Percent of Composition | | | Lap Shear Strength |
|---|---|---|---|---|---|
| | | High | Medium | Low | |
| C | 50 | 25 | 20 | 5 | 2310 psi |
| C | 10 | 0 | 0 | 90 | 50 psi* |
| C | 50 | 0 | 0 | 50 | 990 psi |
| C | 50 | 50 | 0 | 0 | <100 psi* |
| C | 50 | 40 | 0 | 10 | <100 psi* |
| C | 90 | 0 | 0 | 10 | <100 psi* |
| C | 50 | 25 | 0 | 25 | <100 psi* |
| A | 60 | 20 | 0 | 20 | 760 psi |
| A | 60 | 20 | 10 | 10 | 1360 psi |
| A | 60 | 10 | 20 | 10 | 930 psi |
| A | 60 | 20 | 15 | 5 | 2320 psi |
| A | 60 | 0 | 0 | 40 | 50 psi* |

*The bond formed after curing was weak and brittle enough to be broken by hand indicating very poor adhesive properties.

The low molecular weight polyepoxide component is, as is seen from the foregoing data, needed for good tack, while the high green strength is attributable to the high molecular weight component of the polyepoxide mixture. The intermediate molecular weight component is necessary to act as a "compatibilizing" agent for the epoxy system for combining together both the high molecular weight component and the low molecular weight component plus adding support to the polyepoxide system such to inhibit delamination of the cured compositions after heating, thus assuring the composition of its desirable gap-filling characteristics.

The following data show the applicability of the present compositions in tubular joint applications using the tubular joint test as discussed above.

| | | Tubular Joint Test | | | | |
|---|---|---|---|---|---|---|
| Copolyester | Weight Percent of Composition | Polyepoxide Components of Epoxy A in Weight Percent of Composition | | | Tubular Joint Strength | Lap Shear Joint Strength |
| | | High | Medium | Low | | |
| A | 60 | 20 | 0 | 20 | 340 psi | 760 psi |
| A | 60 | 20 | 10 | 10 | 460 psi | 1360 psi |
| B | 50 | 25 | 20 | 5 | 1430 psi | 3580 psi |
| Montac 1050 (a commercially available polyamide adhesive) | | | | | 210 psi | 1210 psi |

The above data show that the compositions containing the polyepoxide mixture having high, intermediate and low molecular weight components exhibit very high and improved bond strengths in the tubular joint test as compared to those compositions containing less than the three required polyepoxide components and also some commercially available materials. A good correlation exists between the lap shear strength test and the tubular joint test in that if a composition exhibits desirable lap shear joint strength then it can be predicted that it will also exhibit favorable tubular joint strength. This correlation has value in the fact that the lap shear joint test is convenient, fast and inexpensive to perform, whereas the tubular joint test is relatively expensive and time-consuming to perform.

The "box test" described above is a test designed to simulate conditions which are very frequently encountered in many industrial applications involving the joining together of mismatched parts.

The following data were obtained for compositions of the present invention and typical commercially available adhesives:

| Copolyester | Weight Percent of Composition | Polyepoxide Components of Epoxy A in Weight Percent of Composition | | | Results |
|---|---|---|---|---|---|
| | | High | Medium | Low | |
| A | 60 | 20 | 10 | 10 | passed-did not crack at dry ice temperatures or upon impacting |
| B | 50 | 25 | 20 | 5 | passed-did not crack at dry ice temperatures or upon impacting |
| Montac 1050 (a commercially available adhesive) | | | | | failed-cracked at dry ice temperature |
| 3M 3535 B/A (a commercially available adhesive) | | | | | failed-cracked at dry ice temperature |

The above data show that the compositions of the present invention are superior in performance to typical commercially available adhesives.

We claim:

1. A copolyester-polyepoxide composition characterized by possessing a single discernible glass transition temperature before curing as measured by differential scanning calorimetry comprising:
   A. a copolyester having a number average molecular weight in the range from about 6,000 to about 50,000; and
   B. a polyepoxide mixture comprising high, intermediate and low molecular weight components wherein
      a. about 25 to 75 weight percent of said mixture is said high molecular weight component having a weight average molecular weight in the range of above 25,000 to about 120,000 and an epoxide equivalent in the range from above 10,000 to about 60,000;
      b. about 15 to 65 weight percent of said mixture is said intermediate molecular weight component having a weight average molecular weight in the range of above 3,000 to 25,000 and an epoxide equivalent in the range from above 1,600 to 10,000;
      c. about 5 to 35 weight percent of said mixture is said low molecular weight component having a weight average molecular weight in the range of about 150 to 3,000 and an epoxide equivalent in the range from about 50 to 1,600, said polyepoxide mixture being present in an amount of at least 50% but not more than about 200% by weight based on said copolyester; and
   C. an epoxy curing agent present in the amount from 0 to about 1.1 equivalents per epoxy equivalent.

2. The composition of claim 1 wherein
   A. the copolyester has a number average molecular weight in the range of about 12,000 to 40,000; and
   B. the polyepoxide mixture comprises
      a. about 35 to 65 weight percent of the high molecular weight component having a weight average molecular weight in the range of about 50,000 to 100,000 and an epoxide equivalent in the range of about 10,000 to 45,000; and
      b. about 25 to 55 weight percent of the intermediate molecular weight component having a weight average molecular weight in the range of about 5,000 to 20,000 and an epoxide equivalent in the range of about 2,000 to 8,000; and
      c. about 5 to 25 weight percent of the low molecular weight component having a weight average molecular weight in the range of about 150 to 1,000 and an epoxide equivalent in the range of about 75 to 1,000, said polyepoxide mixture being present in an amount of at least 50% but not more than about 120% by weight based on said copolyester.

3. The composition of claim 1 wherein said high molecular weight component and intermediate molecular weight component of said polyepoxide mixture are produced by polymerizing the reaction products of epihalohydrins and polyhydric phenols.

4. The composition of claim 1 wherein said high, intermediate and low molecular weight components of said polyepoxide mixture are produced by polymerizing the reaction products of epihalohydrins and polyhydric phenols.

5. The composition of claim 4 wherein said high, intermediate and low molecular weight components of said polyepoxide mixture are produced by polymerizing the diglycidyl ether of bisphenol A.

6. The composition of claim 1 wherein said copolyester is produced by reacting one or more dicarboxylic acids with one or more dihydroxy compounds wherein said dicarboxylic acids are selected from the group consisting of phthalic acid, isophthalic acid, terephthalic acid, sebacic acid, their esters and mixtures thereof and said dihydroxy compounds are selected from the group consisting of ethylene glycol, poly(tetramethylene oxide) glycol, resorcinol di-(beta-hydroxyethyl)-ether and mixtures thereof.

7. The composition of claim 5 wherein said copolyester is produced by reacting one or more dicarboxylic acids with one or more dihydroxy compounds wherein said dicarboxylic acids are selected from the group consisting of phthalic acid, isophthalic acid, terphthalic acid, sebacic acid, their esters and mixtures thereof and said dihydroxy compounds are selected from the group consisting of ethylene glycol, poly-(tetra-methylene oxide)glycol, resorcinol di-(beta-hydroxyethyl)-ether and mixtures thereof.

8. The composition of claim 7 wherein said copolyester is produced by reacting a mixture of dimethylterephthalate, dimethylisophthalate and dimethylsebacate with a mixture of ethylene glycol and poly(tetramethylene oxide) glycol.

9. The composition of claim 7 wherein said copolyester is produced by reacting a mixture of dimethylterephthalate, dimethylisophthalate and dimethyl sebacate with a mixture of poly(tetramethylene oxide)glycol, resorcinol di-(beta-hydroxyethyl)ether and ethylene glycol.

10. The composition of claim 7 wherein said copolyester is produced by reacting a mixture of dimethylterephthalate and dimethylisophthalate with ethylene glycol.

11. The composition of claim 7 wherein said copolyester is produced by reacting a mixture of dimethylterephthalate, dimethylisophthalate and dimethyl sebacate with ethylene glycol.

12. The composition of claim 1 wherein said copolyester is a halogenated copolyester.

13. The composition of claim 1 wherein said copolyester is a polyester-sulfone copolyester.

14. The composition of claim 1 wherein said copolyester is a polyester carbonate.

15. The cured composition of claim 1.

16. The cured composition of claim 7.

17. A process of preparing a copolyester-polyepoxide composition which possesses a single discernible glass transition temperature comprising:
  a. dissolving a copolyester in a solvent therefor;
  b. dissolving a polyepoxide in a solvent therefor which is miscible with the solvent used for the copolyester;
  c. mixing together the solutions of copolyester and polyepoxide with adequate agitation to produce a homogeneous solution; and
  d. recovering the copolyester-polyepoxide composition from the solution by removal of the solvent from the copolyester-polyepoxide composition at such a rate that it exceeds the rate of phase separation between the copolyester and polyepoxide wherein said copolyester-polyepoxide composition comprises:
    A. a copolyester having a number average molecular weight in the range from about 6,000 to about 50,000; and
    B. a polyepoxide mixture comprising high, intermediate and low molecular weight components wherein
      a. about 25 to 75 weight percent of said mixture is said high molecular weight component having a weight average molecular weight in the range of about 25,000 to about 120,000 and an epoxide equivalent in the range from above 10,000 to about 60,000;
      b. about 15 to 65 weight percent of said mixture is said intermediate molecular weight component having a weight average molecular weight in the range of above 3,000 to 25,000 and an epoxide equivalent in the range from above 1,600 to 10,000;
    c. about 5 to 35 weight percent of said mixture is said low molecular weight component having a weight average molecular weight in the range of about 150 to 3,000 and an epoxide equivalent in the range from about 50 to 1,600, said polyepoxide being present in an amount of at least 50% but not more than about 200% by weight based on said copolyester; and
    C. an epoxy curing agent present in the amount from 0 to about 1.1 equivalents per epoxy equivalent.

18. The process of claim 17 wherein said copolyester polyepoxide composition is recovered from the solution by evaporation of the solvents under reduced pressure.

19. The process of claim 17 wherein the said copolyester polyepoxide composition is recovered by dilution with a solvent which is miscible with the solvents used to dissolve the copolyester and polyepoxide mixture but is a nonsolvent for the copolyester-polyepoxide composition.

* * * * *